United States Patent Office 3,494,777
Patented Feb. 10, 1970

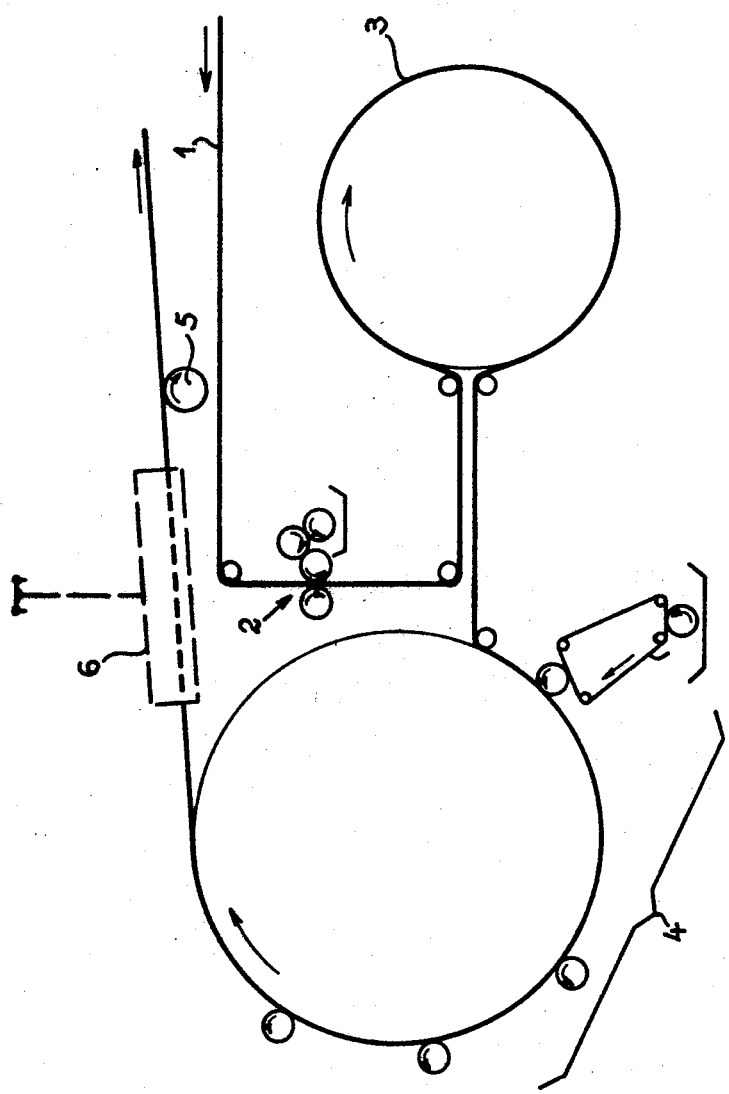

3,494,777
PRINTING OF WASHABLE COLORED
WALLPAPERS
Pierre Talet, Alfortville, and Louis Gandon, Trosly-Breuil, France, assignors to Nobel-Bozel, Paris, France, a company of France
Filed May 11, 1965, Ser. No. 454,915
Claims priority, application France, May 13, 1964, 974,387
Int. Cl. D21h 1/10; B41m 1/24; D06q 1/02
U.S. Cl. 117—15                      7 Claims

ABSTRACT OF THE DISCLOSURE

Polycolored washable wallpaper is produced by continuously coating the paper with the uniform ground color, drying the ground color, printing a plurality of washable inks over the dried ground color, spraying on top of the wet ink an aqueous solution of 5–60% glyoxal at the rate of 0.5 to 20 grams of glyoxal per square meter and at a temperature preferably about 20° C., and finally drying. Besides the glyoxal, the materials may also include a plasticizing agent having a low degree of solubility in water and an emulsion of a vinyl resin, a vinyl acrylic resin, an acrylic resin, or a styrene-butadiene resin.

---

The present invention relates to improvements in the manufacture of washable wallpapers and more particularly those which have been subjected to printing operations.

The normal process of printing wallpaper is well known. A process of this kind will be recalled with reference to the accompanying drawing which shows diagrammatically an installation for the printing of wallpapers.

The paper employed 1 generally known as the "wallpaper support" is generally subjected to a first operation at 2 which comprises the application of a uniform ground color. This is obtained by means of a plain color-sizing machine of any known type, such as a sizing machine with a pressure drum or of the type with an air-blade or with brushes. The paper, coated or not with the ground layer, is then subjected at 3 to a drying operation and is then admitted to the following stage, designated as a whole on the accompanying drawing by the general reference 4, this stage being the application stage of printing in one or more colors. The paper is then taken up at 5 and is sent to the final drying stage.

The finalizing of a composition of printing ink is very awkward, since the binder which it must contain should simultaneously ensure perfect binding of the pigments, retain adequate viscosity and confer satisfactory rheological qualities on the printing coat. It is said of these colors that they should be "fat and ropy."

The agents which are most suitable for this purpose are starches swollen with soda, or even special feculae, in particular the long-chain esters and ethers of starch.

The viscosity of these compositions is high and their particular features reside especially in their aptitude for fully fixing the dyes and for rounding themselves off; it is said that they are "fat."

Now, wallpapers produced by this method have very low strength to wet rub.

A certain number of methods and techniques have already been proposed to give wet strength to coatings (paints, printing) of such papers. In general, a good wet strength is obtained by applying to the wallpaper, after drying, a surface treatment consisting of depositing either a protective film such as a latex of the type of acrylic natural rubber, polymers of vinyl esters, styrenes-butadienes, vinylidene chlorides latex, or wax emulsions, or silicones, or even a coating of an agent (such as glyoxal) which reacts with casein or starch in a manner comparable to tanning, in order to render the coating deposited on the paper insoluble, or by judiciously choosing the binder from the glycol ethers of cellulose or starch and by applying a coating of a salt capable of combining with and rendering soluble the acid residue. This method is also followed when alginates are employed.

These methods have the major drawback of necessitating double handling and result in a considerable increase of damaged paper during manufacture, which make them expensive and prevent their generalized application in the washable wallpaper industry.

In addition, it has also been proposed to introduce into the baths serving for the application of the ground layers, elements capable of giving these layers washable properties with water. The results obtained are satisfactory. But this is not the case when it is desired to increase the resistance of the printing to water. In fact, the binders employed with a base of casein or non-degraded starch are very alkaline and are excessively reactive with certain agents such as glyoxal, and the resorcinol-formols, causing not only an immediate gellification but also modifications of the shades of color, so that the incorporation of such agents in the printing inks results in thickening or detrimental gellification which necessitates a conversion such that the composition no longer gives the same purity and the same opacity to the design. The impossibility of keeping in a stable manner the colors alkaline which are therefore ropy is no doubt the cause of this.

Now it has been found, according to the present invention, a method of resolving all these difficulties and of obtaining directly, after the printing stage, the fixing of the printed colors while at the same time rendering them capable of being washed.

Referring again to the accompanying drawing, the method according to the invention consists of introducing the wet paper coming from the stage 4 into a chamber 6, into which is sprayed a composition capable of immediately gellifying the colored ink applied at 4.

Amongst the compositions suitable for this purpose there may be cited glyoxal, compositions of the formo-phenol (such as resorcinol-formol) type and aldehyde-phenol or the urea-formol and urea-aldehyde types or the like.

It might have been thought that the application of such an agent to the designs while still wet could cause their degradation by splitting or the formation of smudges and/or running marks. Now, it has been found that by applying the method of the invention, after drying the paper under normal conditions, there is obtained a high resistance to water, no modification of the shade of the color applied, and no deterioration or change in the outlines of the designs.

While examining more closely the action of the sprayed reagent on the wet printed paper, and in particular the action of glyoxal, it has been observed that the latter immediately stabilized the wet color by gellifying it, which explains the production of coatings with undegraded and perfectly wasable designs.

According to other characteristic features of the invention:

At least 0.5 gram and a maximum of 20 grams of glyoxal is deposited per square metre, this product being employed in the form of an aqueous solution;

The aqueous solution of glyoxal may be a concentrated or dilute solution;

The glyoxal solution may or may not comprise a plasticizing agent;

The plasticizing agent is selected from those which have low solubility in water;

The glyoxal solution is dispersed in a vinyl-acrylic, acrylic or styrene-butadiene emulsion or in any other elastomer system compatible with glyoxal;

When the glyoxal solution comprises a plasticizing agent, the relative proportions of this latter with respect to the glyoxal can vary over a wide range, for example from 80:20 to 20:80, these proportions being given for dry materials;

The spraying is carried out under pressure at temperatures varying from 1 to 90° C., and preferably in the vicinity of 20° C.

The concentration of utiliztaion of the solution may vary between 5 and 60%, but preferably varies between 10 and 40%.

The printing ink preferably contians, as a binding agent, a fecula swollen with soda or dispersed in water, or any other natural, artificial or synthetic binder capable of reacting with glyoxal, and preferably capable of being very rapidly gellified in the presence of glyoxal.

Other characteristic features and advantages of the invention will be more clearly brought out in the description which follows below and in the examples given hereinafter by way of illustration and not in any limitative sense.

EXAMPLE 1

There were utilized in this example aqueous compositions with a 5% base of glyoxal and deposits were made on a wet printed paper at the rate of 1 gram of glyoxal per square metre. A paper which was subjected to this treatment with glyoxal alone had a washability of 150 (determined by the Doitteau plinometer), a double fold of 5 and a tearing index of 68.

A sample not treated with glyoxal had zero washability, a double fold of 12 and a tearing index of 76.

The same solution of glyoxal comprising in addition 20% of glycerol triacetate (percentage counted with respect to dry substances) results in the same washability, the double fold is 6 and the tearing index is 88.

The same solution of glyoxal comprising 25% of an acrylic polymer in the form of a latex such as that which is sold commercially under the name of "Acronal 300D" gives a washability of 150 to 200, a double fold of 7, and a tearing index of 72.

Finally, the same solution of glyoxal containing 25% of a vinyl-acrylic co-polymer comprising 2-ethyl-hexyl acrylate in the form of a latex such as that sold by the Nobel Bozel Company under the name of "Nobel-acryl-VA20" gives a washability of 150 to 200, a double fold of 11 and a tearing index of 96.

In the examples following, which were carried out on a six-color wallpaper printing machine, the same formula as above was substantially employed, namely the composition consisting of glyoxal+Nobel-acryl VA20.

EXAMPLE 2

A dispersion is made having the following composition:

| | Parts |
|---|---|
| Nobel-acryl VA20 with 55% of dry material | 72 |
| Glyoxal with 37.5% of dry material | 28 |

The characteristics of this dispersion were as follows:

| | |
|---|---|
| Proportion of dry material _____percent__ | 50 |
| Density at 20° C. _____ | 1.12 |
| pH value _____ | 3.2 |
| Viscosity after 2 hours manufacture _____ cps__ | 110 |

A dispersion of this kind is stable to cold at −5° C. and withstands up to 40° C. without ill effects.

On a six-color wallpaper printing machine fed with a hanging paper previously plain-color sized and dried on a drum of 2.50 m. in diameter at a temperature of 90° C., working at a linear speed of 36 metres per minute, a spraying was effected by means of two nozzles at a distance of 35 centimetres and 45 centimetres in height from the sheet at a pressure of 2 kgs. with a solution having the same composition as that given above, the latter being diluted from 1 to 10.

The average quantity of dry material deposited was 2.2±0.1 grams per square metre, the test having been carried out on 5730 metres of paper printed with red colors in pure pigment.

The appearance of the coating after 30 applications of a sponge impregnated with soap of the plinometer was excellent and the coating was only very slightly worn after 100 applications of the sponge. Under these conditions, the combined tearing index for the direction of operation+the transverse direction was 51.5 as compared with 46 for the control-sample, and the double fold in the transverse direction remained at 17 as compared with 18 for the control-sample.

The clarity of the designs and the brightness of the colors were not degraded by this treatment.

EXAMPLE 3

Working on this same equipment with a single nozzle placed at 65 cm. from the sheet and employing the same dispersion brought from 1 to 5 by dilution (namely 10% of dry material) and operating at a pressure of 4 kgs., there were deposited during the course of the test carried out on 1150 metres, 3.6 grams of dry material+0.4 gram per square metre.

Under these conditions, the resistance to wet rub by soapy water was remarkable, since after 100 passes still no wear was observed, although the designs were floral pattern in scarlet colors with veins of bronze color. The tearing index was 10.5 in the direction of running of the machine and 31.5 in the transverse direction.

EXAMPLE 4

The operation is now carried out with a spraying distributor having two staggered arms fitted with two nozzles. Each nozzle is supplied separately. The distance between the nozzle is 40 cm. in the transverse direction and 50 cm. in the direction of running of the machine. They are located at 56 to 58 cm. above the sheet.

The operation is effected using the dilute dispension with one and a half times its volume of water, at a pressure of 3.3±0.1 kg. per sq. cm.

In this manner, 5 grams of dry material were deposited per square metre.

There was obtained a paper with a perfectly satisfactory appearance, standing up to 60 passes of the sponge of the Doittau plinometer, and tearing indexes of 25.5 to 34 were obtained as against 26.5 to 35 for a control-sample.

EXAMPLE 5

Using the same equipment, the spraying was carried out with a solution identical with that described in Example 2, but diluted with twice its volume of water. In this way, it was possible to obtain, for a deposit of 3.5 to 3.8 grams of dry material per square metre, very washable papers having tearing indices of 26.5 to 37 as against 26.5 to 35 for a control-sample.

EXAMPLE 6

The same procedure is followed as in Examples 4 and 5, but working with a solution as specified in Example 2, and diluted by four times its volume of water. 2.5 grams of dry material were deposited per square metre and a paper was obtained which withstood 60 passes of the wet sponge in the Doittau plinometer and which had tearing indices of 28/40.5 as against 27.5/35 for a control-sample.

In all the foregoing examples, no running was observed during the course of driving by the hooking, devices, and after drying no difficulties were experienced during reeling, the sheets not having the "tiling" effect.

EXAMPLE 7

In the case of coated paper, whether this is intended for decoration or for writing paper, the operations are carried out as follows:

A composition is prepared intended to be applied by a scraper, and having a viscosity of about 800 cps. at 20° C., the measurement of this viscosity being effected with the Brookfield apparatus at 50 r.p.m. This composition has 56% of dry materials and its composition is as follows:

| | Parts by weight |
|---|---|
| Water | 40 |
| Hexametaphosphate | 0.6 |
| Kaolin, type Dinkie A | 100 |
| Binder with a base of fecula type amylo-pectin at a concentration of 20% | 60 |

In a composition of this kind, the addition of glyoxal would necessarily cause almost immediate gellification. In addition, the addition of a latex, such as for example an emulsion of a vinyl-acrylic or acrylic co-polymer would increase the viscosity to an extent which would not permit a normal application of the composition on the paper.

Now, in accordance with the present invention, the above-mentioned composition can be employed in association with glyoxal and/or with an acrylic polymer by proceeding in the following manner:

The operation is effected for example with a Dixon coating machine by applying the coating in two stages:

(1) A coating is deposited having a composition of which the formula has been given above;

(2) On the paper which is still wet from this coating, there is projected a solution with a base of glyoxal or an acrylic polymer or a mixture of the two.

The application of the initial coating is made with a trailing blade, while the projection of the glyoxal or the acrylic latex is made with an air-blade, the two devices only being separated from each other by a few centimetres.

The test was carried out at ambient temperature on a paper support of the type Afnor IV with a strength of 50, the speed of the machine being regulated to 30 metres per minute.

The results of the tests are shown on the following table:

veloped by the Graphical Research Institute TNO in Amsterdam. The oils standardized by this Institute are employed with three different viscosities, or the Lorilleux-France inks No. 3800–3808 with increasing printing-off.

Pick-test, carried out with standard "Dennison" waxes, following the method T459m-48 published by the Technical Association of the Pulp and Paper Industry, U.S.A.

Ring-crust, TAPPI specification T472m-51.

Flat-crush, carried out by "Concora Medium Fluter Procedures"; prepared by the Corporation of America Central Laboratory, Chicago, Ill.

Wet strength, French specification Q03–013.

Length of break, French specification Q03–004.

Bursting, French specification Q03–014.

From an examination of this table, it can be seen that the values of the pick test and of the IGT which are specifically associated with the adhesion of the coating on the paper were substantially increased. In addition, the resistance to wet rub expressed as "washability" increased to a high value. By projecting of an acrylic latex, the results, while representing an advance compared with the control-sample, are substantially inferior to those obtained with glyoxal alone. The addition of the glyoxal to the latex, necessitated by the wish to obtain a brilliant surface after calendering, enables the other characteristics obtained with glyoxal alone to be again produced.

It will of course be understood that the present invention has only been described purely by way of explanation and not in any limitative sense, and that any useful modification may be made thereto without thereby departing from its scope.

We claim:

1. A process for the manufacture of papers having at least one coating of washable ink, consisting essentially of a binder of starches swollen with soda, starches, dispersed in water, or long-chain esters or ethers of starch, comprising the spraying on a wet inked paper derived from a prior printing stage, of an aqueous solution containing from 5 to 60% by weight of glyoxal in dispersion in an emulsion of vinyl ester polymer, vinyl-acrylic co-polymer, styrene-butadiene or other elastomer compositions compatible with glyoxal and a plasticizing agent having a low degree of solubility in water, in a ratio of plasticizing agent to glyoxal comprised between 80:20 and 20:80, said ratio being given for dry materials, said spraying being effected under pressure at a temperature comprised between 1 and 90° C.

2. A process in accordance with claim 1 wherein said

| | | Number of test | | | | |
|---|---|---|---|---|---|---|
| | | 0 | 1 | 2 | 3 | 4 | 5 |
| Nature of test | | | No projection with air-blade | Projection of 3% glyoxal solution by by air-blade | Projection of acrylic polymer with air-blade | Projection of a 1/1 mixture of acrylic polymer and glyoxal with air-blade | No projection by air-blade |
| Dry materials deposited: | | | | | | | |
| Deposit by trailing blade | | (1) | 5.8 | 5.8 | 5.8 | 5.8 | 5.8 |
| Air blade deposit | | (1) | 0 | ↑ | 0.6 | 0.8 | 0 |
| Total deposit | | | 5.8 | 6.7 | 6.4 | 6.6 | 5.8 |
| Whiteness obtained | | 68 | 73.5 | 73.9 | 72.8 | 73.3 | 73.5 |
| Pick-test | | Nil | 6 | 8 | 6–7 | 7–8 | 6 |
| IGT inks: | | | | | | | |
| Ink 3802 [2] | | (3) | 45–65—becoming fluffy and tearing. | 68–84—slight tearing. | Less than 38—considerable spot marks. | 65–78—spot-marks | 53—becoming fluffy and tearing. |
| IGT wet test still 3800 [2] | | (3) | Refusal to take ink at first. | Spot marks without tearing. | Slight spot marks | Spot-marks | Refusal to ink. |
| Washability [4] | | (3) | Extremely worn after 5 spongings. | Extremely small wear after 100 spongings. | Fairly worn after 20 spongings. | Fairly worn after 100 spongings. | Extremely worn after 5 spongings. |

[1] Paper support.   [2] Standard Lorilleux inks.   [3] No measurement.   [4] Resistance to the Doittau plinometer.

In the above table:

IGT represents the tearing-off tests carried out on an IGT printing apparatus. This apparatus has been despraying is effected under pressure at a temperature between 1 and 20° C.

3. A process for the manufacture of colored washable paper comprising continuously passing paper to a printing device and then printing at least one wet design of a washable ink on said paper, said ink containing a binding agent of starches swollen with soda, starches dispersed in water, or long-chain esters and ethers of starch, spraying a liquid composition of an aqueous glyoxal solution of 5–60% by weight glyoxal onto the wet inked paper to effect immediate gellification of said wet ink, and drying said wet, gellified ink.

4. A process in accordance with claim 3 wherein said glyoxal composition comprises said glyoxal dispersed in an emulsion of vinyl ester polymer, vinyl-acrylic copolymer, styrenebutadiene resin or other elastomer compositions compatible with glyoxal, and further including a plasticizing agent having a low degree of solubility in water.

5. A process in accordance with claim 3 wherein said glyoxal concentration is 10–40%.

6. A process in accordance with claim 3 wherein said glyoxal composition further contains a plasticizing agent having a low degree of solubility in water.

7. A method as claimed in claim 6, in which the relative proportions of the plasticizing agent with respect to the glyoxal are within the range comprised between 80:20 and 20:80, these ratios being given for dry materials.

References Cited

UNITED STATES PATENTS

| | | | |
|---|---|---|---|
| 2,696,168 | 12/1954 | Costello | 101—416.2 |
| 2,974,058 | 3/1961 | Pihl | 101—416.20 X |
| 2,616,818 | 11/1952 | Azorlosa | 117—155 |
| 2,617,743 | 11/1952 | Grimm | 117—62.2 |
| 2,652,345 | 9/1953 | Jones | 117—62.2 |
| 2,772,184 | 11/1956 | Wolfe et al. | 117—64 |
| 3,068,118 | 12/1962 | Biskup et al. | 117—15 X |
| 3,343,075 | 9/1967 | Daneski et al. | 117—15 X |

FOREIGN PATENTS 634,634  3/1950  Great Britain.

OTHER REFERENCES

Ellis, Carleton: Printing Inks, Reinhold Publishing Corp., New York, 1940, p. 396.

WILLIAM D. MARTIN, Primary Examiner

M. R. LUSIGNAN, Assistant Examiner

U.S. Cl. X.R.

117—62.2, 155, 156